United States Patent [19]
Chang

[11] Patent Number: 5,547,099
[45] Date of Patent: Aug. 20, 1996

[54] COVER ASSEMBLY FOR PERMITTING ACCESS INTO A CONTAINER WITHOUT REMOVAL THEREFROM

[76] Inventor: Mong-Shiang Chang, No. 2, Hsin-Hsing Rd., Wu-Jin Hsiang, Taichung Hsien, Taiwan

[21] Appl. No.: 380,999

[22] Filed: Jan. 31, 1995

[51] Int. Cl.⁶ .................................................. B65D 55/02
[52] U.S. Cl. ................ 220/212.5; 220/254; 220/86.2; 220/DIG. 33; 251/174; 251/177
[58] Field of Search ................... 220/212.5, 253, 220/254, 373, 86.2, DIG. 33, DIG. 32; 222/531, 532, 534, 536, 537; 251/174, 176, 177

[56] References Cited

U.S. PATENT DOCUMENTS

| | | | |
|---|---|---|---|
| 2,801,767 | 8/1957 | Mariani | 220/86.2 |
| 2,979,238 | 4/1961 | Bramming | 222/484 |
| 3,228,652 | 1/1966 | Antrim | 251/315.14 |
| 4,137,936 | 2/1979 | Sekimoto et al. | 137/246.22 |
| 4,485,963 | 12/1984 | Panicci | 222/536 X |
| 4,676,480 | 6/1987 | Garceau et al. | 251/174 X |
| 5,195,566 | 3/1993 | Ott et al. | 141/312 |
| 5,205,536 | 4/1993 | Holec | 251/174 X |

*Primary Examiner*—Stephen K. Cronin
*Attorney, Agent, or Firm*—Oblon, Spivak, McClelland, Maier, & Neustadt, P.C.

[57] ABSTRACT

A cover assembly for a container includes: a cylinder base body with an axial bore therethrough, a lower portion for engaging an entry of the container, and an annular flange extending inwardly and radially into the axial bore; a shield mounted on an upper portion of the base body and having a central opening aligned with the axial bore of the base body; and a valve unit including a coil spring provided within the axial bore and placed on the annular flange, a hollow cylinder-shaped valve seat provided axially in the axial bore of the base body and inserted into the coil spring such that the valve seat can communicated with the container. The valve seat has an outwardly and radially extending press member which is biased by the coil spring toward the shield, and a blocking valve with a spherical external face and an axial hole extending therethrough. The blocking valve is provided resiliently between the valve seat and the shield and is connected pivotally to the shield such that the blocking valve is pivotable relative to the shield between a first position which permits access into the container and a second position which denies access into the container.

4 Claims, 3 Drawing Sheets

5,547,099

COVER ASSEMBLY FOR PERMITTING ACCESS INTO A CONTAINER WITHOUT REMOVAL THEREFROM

BACKGROUND OF THE INVENTION

1. Field of the Invention

The invention relates to a cover assembly, more particularly to a cover assembly that permits access into a container without the need to remove the cover assembly therefrom.

2. Description of the Related Art

Presently, different cover assemblies have been invented for different containers, none of which can fully satisfy a consumer because of the need to detach the cover assemblies from the container every time the container is emptied or replenished. For example, the cover assembly of a gas tank in an automobile has to be detached when refilling the latter with gasoline. Thus, the cover assembly may accidentally get lost, thereby resulting in a lot of inconvenience.

SUMMARY OF THE INVENTION

The main object of the present invention is to provide a cover assembly which permits access into a container without removal therefrom.

Accordingly, the cover assembly of the present invention includes: a base body with a cylindrical wall which confines an axial bore therethrough with a lower portion for engaging an entry of a container, an upper portion which is exposed exteriorly of the container, and an annular flange which extends inwardly and radially from the cylindrical wall into the axial bore; a shield mounted to the upper portion of the base body and having a central opening aligned with the axial bore of the base body; and a valve device including a coil spring provided within the axial bore and placed on the annular flange, a hollow cylinder-shaped valve seat provided axially in the axial bore of the base body and inserted into the coil spring such that the valve seat is communicated fluidly with the container, the valve seat having an outwardly and radially extending press member which is biased by the coil spring toward the shield, and a blocking valve with a spherical external face and an axial hole extending therethrough, the blocking valve being provided between the valve seat and the shield and being connected pivotally to the shield such that the blocking valve is pivotable relative to the shield between a first position, wherein the axial hole of the blocking valve is communicated with the central opening of the shield and the container via the valve seat, and a second position, wherein the spherical face covers the valve seat, thereby blocking communication between the central opening of the shield and the valve seat.

Thus, the user of a container, such as a gas tank, which is provided with the cover assembly of this invention does not have to detach the cover assembly from the container. He only needs to pivot the blocking valve to one of two different positions in order to close the container or gain access into the container.

BRIEF DESCRIPTION OF THE DRAWINGS

Other features and advantages of the present invention will become more apparent in the following detailed description of the preferred embodiment with reference to the accompanying drawings, in which.

DETAILED DESCRIPTION OF THE PREFERRED EMBODIMENT

A cover assembly according to the present invention is to be mounted on a container, such as a gasoline tank, in order to close or open the latter without the need to remove the cover assembly therefrom.

Figure 1:
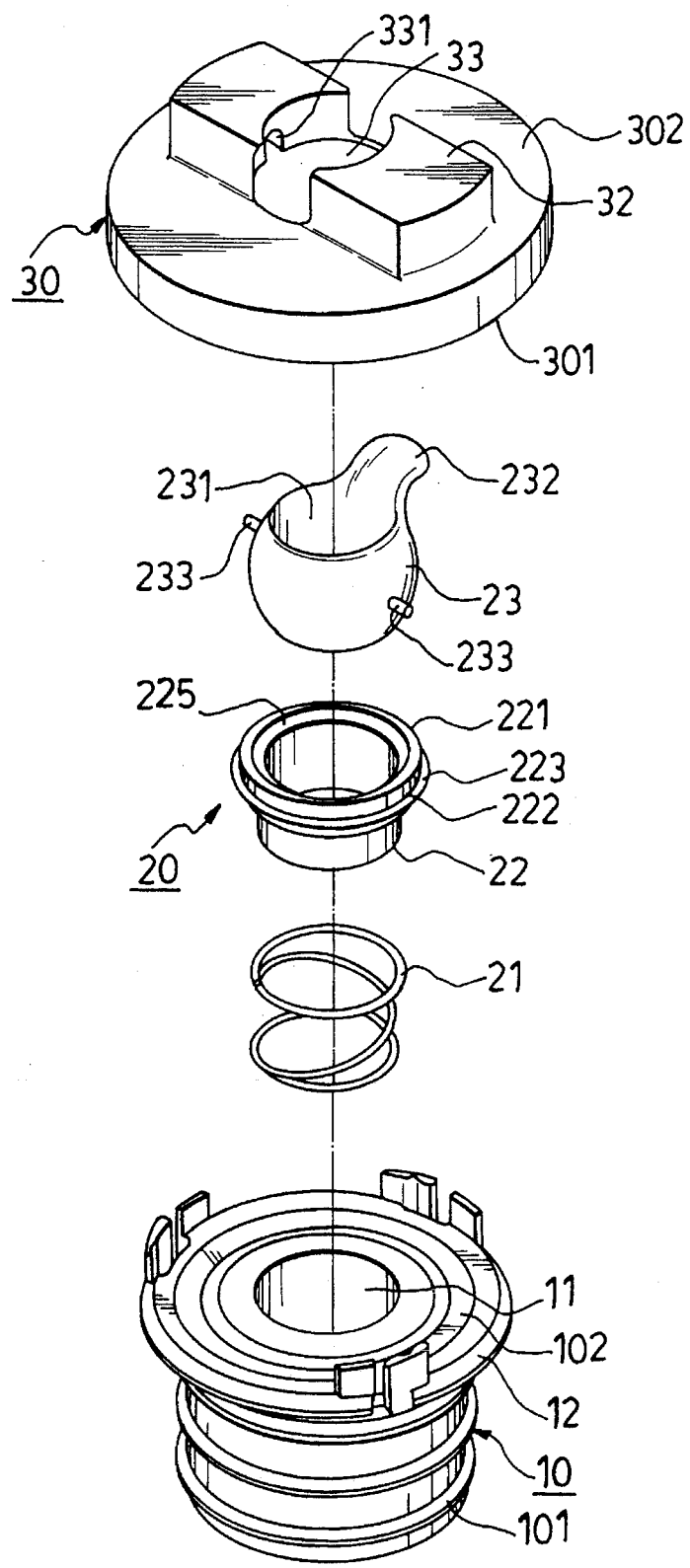
FIG. 1 is an exploded view of a preferred embodiment of a cover assembly of the present invention.
Figure 2:
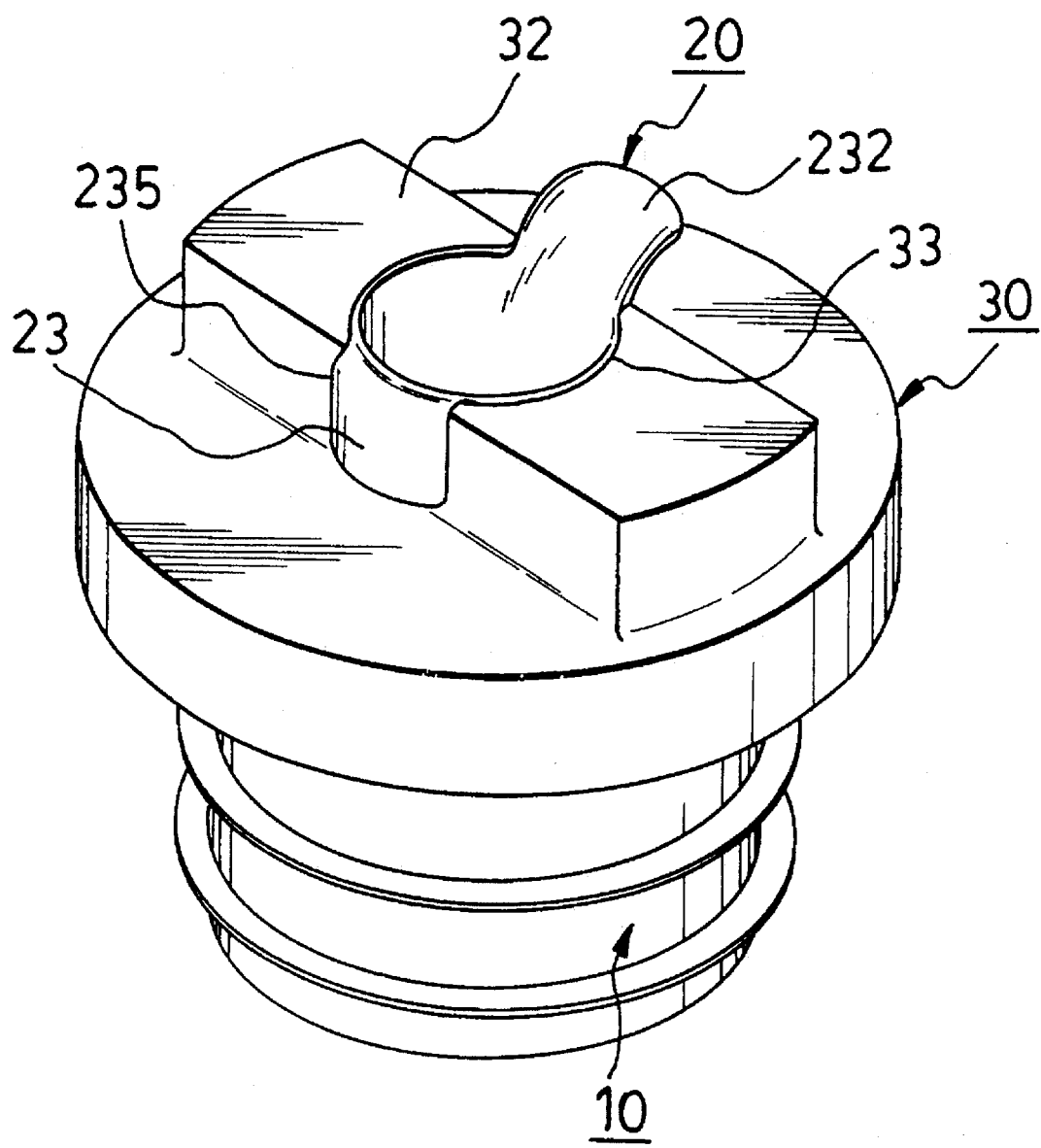
FIG. 2 is an assembled view of the preferred embodiment of the present invention.

Referring to FIGS. 1 and 2, a preferred embodiment of the cover assembly includes a base body 10, a valve device 20 and a shield 30.

The base body 10 is shaped substantially as a cylindrical wall which confines an axial bore 11 therethrough with a lower portion adapted to engage an entry of a common gasoline tank (not shown), an upper portion 102 which is to be exposed exteriorly of the common gasoline tank after attachment thereto, and an annular flange 111 (see FIG. 3) which extends inwardly and radially from the cylindrical wall into the axial bore 11 of the base body 10.

The shield 30 can be mounted to the upper portion 102 of the base body 10 by any conventional method, such as by snap-fit connection means. The shield 30 has a central opening 33 aligned with the axial bore 11 of the base body 10, an internal surface 301 which faces a blocking valve 23, an external surface 302 opposite to the internal face 301, and two aligned recesses 331 formed in the internal surface 301 at two sides of the central opening 33 and communicated therewith, the purpose of which will be explained in the following paragraphs.

Figure 3:
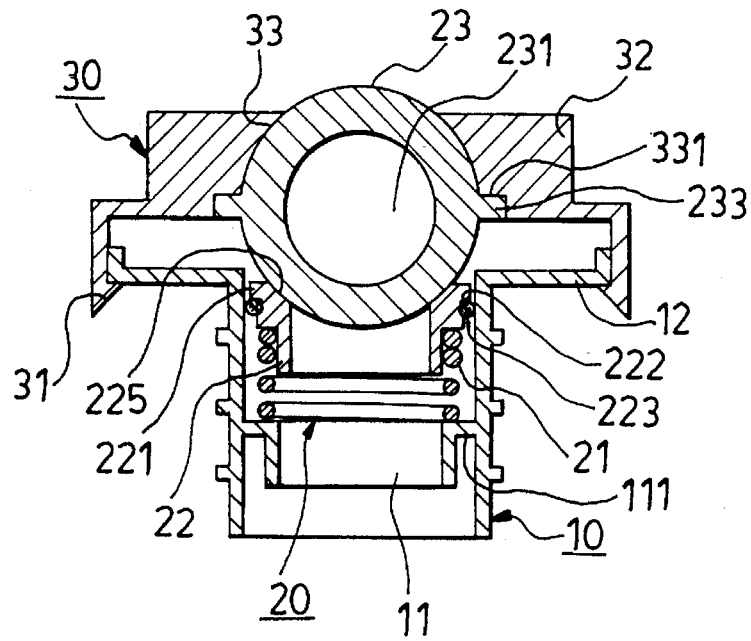
FIG. 3 is a cross sectional view of the preferred embodiment, illustrating the preferred embodiment when blocking access into a container on which the former is to be mounted.
Figure 4:
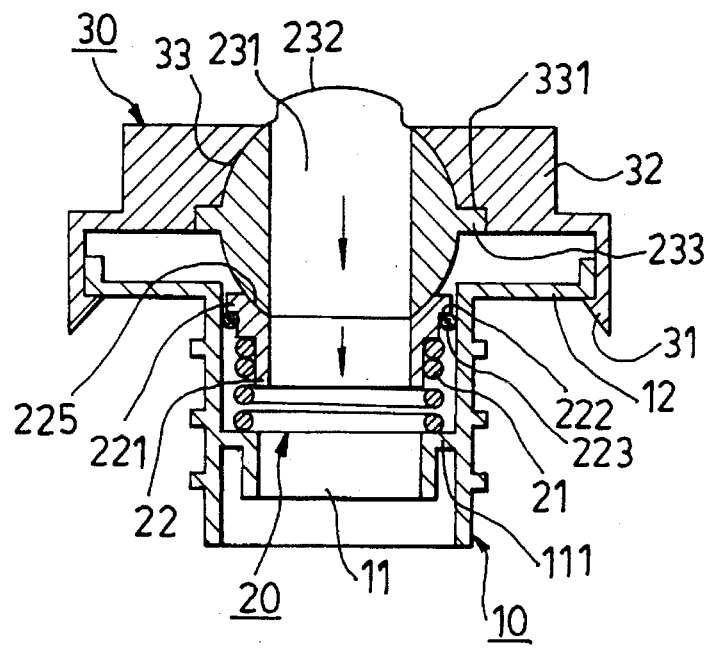
FIG. 4 shows a cross sectional view of the preferred embodiment when permitting access into the container.

The valve device 20 includes a coil spring 21, a valve seat 22 and the blocking valve 23. The coil spring 21 is provided within the axial bore 11 and is placed on the annular flange 111 of the base body 10. The valve seat 22 is a hollow cylinder provided axially in the axial bore 11 of the base body 10 and inserted into the coil spring 21 such that the valve seat 22 is communicated with the gasoline tank (not shown). The valve seat 22 has an outwardly and radially extending press member 221 which is biased by the coil spring 21 such that the valve seat 22 is biased toward the shield 30. The blocking valve 23 has a spherical external face, an axial hole 231 which extends therethrough and two opposed pivot rods 233 which project from the spherical face. The blocking valve 23 is provided between the valve seat 22 and the shield 30 such that the pivot rods 233 of the blocking valve 23 engage the aligned recesses 331 of the shield 30 due to the biasing action of the coil spring 21. The blocking valve 23 further has a protrusion 232 projecting therefrom. The protrusion 232 has a surface which extends smoothly and integrally from a surface which confines the axial hole 231 of the blocking valve 23. The protrusion 232 extends out from of the shield 30 via the central opening 33. The blocking valve 23 can be pivoted by manipulating the protrusion 232 between the first position, wherein the axial hole 231 of the blocking valve 23 is communicated with the central opening 33 of the shield 30 and the gasoline tank via the valve seat 22, as shown in FIG. 4, and a second position, wherein the spherical face of the blocking valve 23 covers the valve seat 22 and the central opening 33 of the shield 30, thereby blocking communication between the central opening 33 of the shield 30 and the valve seat 22, as shown in FIG. 3.

The cover assembly of the present invention should close sealingly the gasoline. In order to accomplish this objective, a circumferential groove 222 is formed around the press member 221, an O-shaped ring 223 is placed sealingly in the circumferential groove 222 of the press member 221. Thus, the O-shaped ring 223 contacts slidably and sealingly the cylindrical wall of the base body 10 when the valve seat 22 moves axially in the axial bore 11 of the base body 10 due to pivotal action of the blocking valve 23.

The shield 30 is further provided with two aligned protrusions 32 formed on the external surface 302 at two sides of the central opening 33. Thus, a portion of the blocking valve 23, which has the protrusion 232 and which projects from the central opening 33 of the shield 30, is protected by the aligned protrusions 32, as shown in FIG. 2. When refilling the gasoline tank, the filling mouth of the gasoline pipe can rest on the protrusion 232. Furthermore, the upper portion of the valve seat 22 is constructed to form a curved portion 225 for facilitating pivotal action of the blocking valve 23.

Thus, there is no need to detach the cover assembly of the present invention from the gasoline tank when refilling the latter.

With the present invention thus explained, it is obvious to those skilled in the art that various modifications and variations can be made without departing from the scope and spirit of this invention. It is therefore intended that this invention be limited only as in the appended claims.

I claim:

1. A cover assembly for a container, permitting access into said container without removal therefrom, said cover assembly comprising:

a base body having a cylindrical wall defining an axial bore therethrough with a lower portion for engaging an entry of said container, an upper portion to be exposed exteriorly of said container, and an annular flange extending inwardly and radially from said cylindrical wall into said axial bore;

a shield mounted to said upper portion of said base body and having a central opening aligned with said axial bore of said base body;

a valve device having a coil spring provided within said axial bore and placed on said annular flange, a hollow cylinder-shaped valve seat provided axially in said axial bore of said base body and inserted into said coil spring such that said valve seat is in communication with said container, said valve seat having an outwardly and radially extending press member biased by said coil spring toward said shield, and a blocking valve with a spherical external face and an axial hole extending therethrough, said blocking valve being provided between said valve seat and said shield and being connected pivotally to said shield such that said blocking valve is pivotable relative to said shield between a first position, wherein said axial hole of said blocking valve is communicated with said central opening of said shield and said container via said valve seat, and a second position wherein said spherical face covers said valve seat, thereby blocking communication between said central opening of said shield and said valve seat; and said shield having an internal surface facing said valve device, an external surface opposite to said internal surface, and two aligned protrusions formed on said external surface at two sides of said central opening for protecting an upper portion of said blocking valve.

2. A cover assembly as defined in claim 1, wherein said blocking valve has a protrusion extending out from said shield via said central opening of said shield for manipulating said blocking valve between said first and second positions.

3. A cover assembly as defined in claim 1, further comprising an O-shaped ring disposed sealingly around said press member and contacting sealingly and slidably said cylindrical wall of said base body.

4. A cover assembly as defined in claim 1, wherein said shield has an internal surface facing said blocking valve, an external surface opposite to said internal surface, and two aligned recesses on said internal surface at two sides of said central opening and communicated with said central opening, said blocking valve having two opposed pivot rods projecting from said spherical face and engaging said aligned recesses of said shield due to biasing action of said coil spring.

* * * * *